United States Patent
Romack

(10) Patent No.: US 7,500,697 B2
(45) Date of Patent: Mar. 10, 2009

(54) SNAP RING LOCKING CLIP AND METHOD

(75) Inventor: Carl M. Romack, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 6 days.

(21) Appl. No.: 11/341,780

(22) Filed: Jan. 27, 2006

(65) Prior Publication Data
US 2007/0176412 A1 Aug. 2, 2007

(51) Int. Cl.
F16L 25/00 (2006.01)

(52) U.S. Cl. .................... 285/328; 285/81; 285/305; 285/321; 285/403; 285/425; 24/457; 403/359.5

(58) Field of Classification Search .............. 285/39, 285/80, 81, 305, 321, 328, 403, 425; 403/297, 403/318, 319, 320, 359.1, 359.5, 361, DIG. 7, 403/359.2, 359.3, 359.4, 359.6; 411/517, 411/516, 518, 519, 520, 521; 24/457, 458, 24/581.11, 563; 248/36.9, 316.1, 316.2, 248/312.1, 316.7; 464/154, 158, 162, 182; 292/80, 84, 89, 303
See application file for complete search history.

(56) References Cited

U.S. PATENT DOCUMENTS

| | | | | |
|---|---|---|---|---|
| 1,645,342 A | * | 10/1927 | Moorhouse | 74/343 |
| 2,565,636 A | * | 8/1951 | Tinnerman | 292/76 |
| 2,800,800 A | * | 7/1957 | Dunn | 74/325 |
| 2,960,359 A | * | 11/1960 | Leland | 403/318 |
| 3,388,934 A | * | 6/1968 | Craig et al. | 403/357 |
| 3,703,305 A | * | 11/1972 | Wise et al. | 403/357 |
| 3,709,574 A | | 1/1973 | Potter | |
| 3,762,455 A | * | 10/1973 | Anderson, Jr. | 411/190 |
| 3,853,413 A | * | 12/1974 | Parran | 403/318 |
| 3,924,957 A | * | 12/1975 | Camosso | 403/352 |
| 4,261,599 A | * | 4/1981 | Streed | 285/81 |
| 4,406,641 A | * | 9/1983 | Mallet | 464/162 |
| 4,423,643 A | * | 1/1984 | McNamara | 74/331 |
| 4,435,963 A | * | 3/1984 | Shigeru | 63/18 |
| 5,082,454 A | * | 1/1992 | Tonkiss et al. | 439/320 |
| 5,181,792 A | * | 1/1993 | Grochowski | 403/359.5 |
| 5,234,278 A | * | 8/1993 | Hall et al. | 403/359.5 |
| 5,437,351 A | * | 8/1995 | Lindner | 188/18 A |
| 5,484,223 A | * | 1/1996 | Saito | 403/329 |
| 5,645,366 A | * | 7/1997 | Ishibashi et al. | 403/359.5 |
| 5,647,618 A | * | 7/1997 | Lamberth | 292/19 |
| 6,158,265 A | * | 12/2000 | Prater | 72/326 |
| 6,428,236 B2 | * | 8/2002 | Aota et al. | 403/359.5 |
| 6,520,296 B1 | * | 2/2003 | Bunker | 188/18 A |
| 6,533,374 B2 | * | 3/2003 | Hightower | 312/236 |
| 6,811,005 B2 | * | 11/2004 | Blewitt et al. | 188/73.38 |
| 6,843,350 B2 | * | 1/2005 | Larkin et al. | 188/218 XL |
| 7,311,463 B2 | * | 12/2007 | Haupt | 403/372 |

* cited by examiner

Primary Examiner—James M Hewitt
Assistant Examiner—Jay R Ripley

(57) ABSTRACT

A locking device and method to eliminate rotation or dislodging of a snap ring relative to a snap ring groove is provided. A locking clip is provided that may be used as a retention clip, with or without the use of a snap ring. The locking device for a housing assembly to retain a part comprises a locking clip, insertable between the retained part and the housing, wherein the locking clip comprises a clip body; a first locking tab connected to the clip body; and a locating tab connected to the clip body. In rotating assemblies, the elimination of snap ring movement improves the balance and wear of the assembly.

10 Claims, 2 Drawing Sheets

SNAP RING LOCKING CLIP AND METHOD

TECHNICAL FIELD

This invention relates to a locking clip that may be used to retain a snap ring and improve balance in rotating assemblies including the snap ring.

BACKGROUND OF THE INVENTION

A snap ring is employed to retain a part within a housing assembly. The shape of the snap ring is generally circular, with a gap to allow for insertion of the snap ring into the housing assembly. Rotation or dislodging of the snap ring may lead the snap ring to come out of the assembly.

SUMMARY OF THE INVENTION

The present invention relates to a locking device and method to eliminate rotation or dislodging of a snap ring relative to a snap ring groove, which is a groove within a housing in which the snap ring is placed. More specifically, the invention relates to a locking clip that may be used as a retention clip, with or without the use of a snap ring.

In rotating assemblies, the elimination of snap ring movement is needed to control the balance and wear of the assembly. In stationary assemblies, the locking device is needed to control the position of the weaker area of the snap ring, the snap ring gap, to a known and strengthened area of the housing i.e., the snap ring gap is anchored to a stationary part of the housing. The locking clip will also eliminate any possibility of the snap ring coming out of the assembly. In lightly loaded applications the locking device can eliminate the need for the snap ring completely. The item previously retained by the snap ring within a housing assembly may be retained by the locking device only.

The locking device for a housing assembly to retain a part comprises a locking clip, insertable between the retained part and the housing, wherein the locking clip comprises a clip body; a first locking tab connected to the clip body; and a locating tab connected to the clip body.

In one aspect of the invention the clip body has a first surface; wherein the first locking tab is formed on the first surface of the clip body; and wherein the locating tab is formed on the first surface of the clip body. In another aspect of the invention, the locking device further comprises a second locking tab on the first surface of the clip body; and wherein the first locking tab and the second locking tab retain the locking clip in the housing.

In another aspect of the invention, the housing has a housing spline; the retained part has a retained part spline; wherein the locating tab is fittable between the retained part and the housing in a tab clearance formed by the housing spline and the retained part spline. In another aspect of the invention, the clip body has a bottom surface; and wherein the bottom surface is shaped to permit assembly clearance for the locking clip.

In another aspect of the invention, the locking device further comprises a snap ring fittable into a groove within the housing, wherein the snap ring is circular shaped with a gap in the snap ring; and wherein the locking clip is fittable into the gap in the snap ring, thereby preventing rotation of the snap ring.

Another aspect of the invention provides a method of limiting movement and thereby balancing a gapped snap ring in a snap ring groove between rotatable parts which includes locating a mass in the snap ring gap in the snap ring groove, wherein the mass is substantially equal to the mass of the material missing from the snap ring to form the gap, whereby to balance the rotation of the parts and snap ring. The method may also include positioning a tab portion of the mass in a clearance between the rotatable parts where such parts are interlocking to assist in the location of the mass and may further comprise locking the mass in the snap ring groove after positioning the tab portion in the clearance.

The above features and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
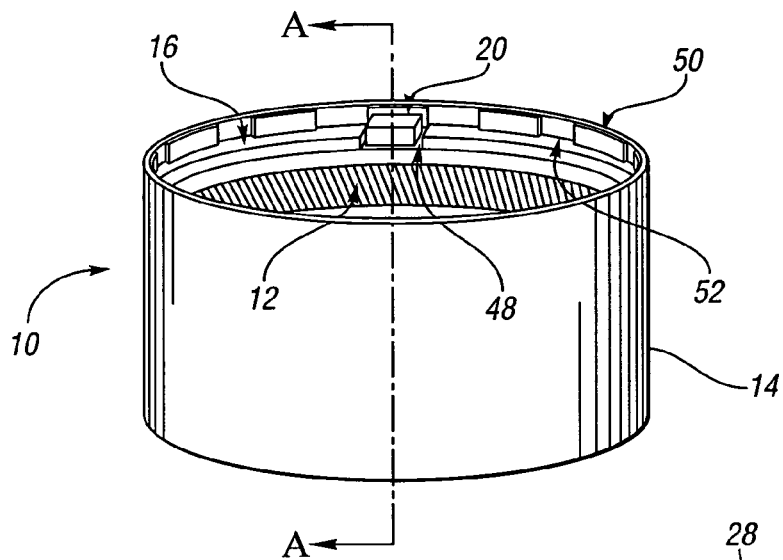
FIG. 1 is a schematic perspective view of a housing assembly illustrating a snap ring and insertable locking clip.

A locking device and method for a housing assembly 10 to retain a part is provided. The retained part illustrated in the preferred embodiment is a gear 12. With reference to FIG. 1, the housing assembly 10 comprises a housing 14 and a gear 12 retained inside of the housing 14 with a snap ring 16. The snap ring 16 is inserted into a snap ring groove 18, which is a groove inside the housing 14.

Figure 2:
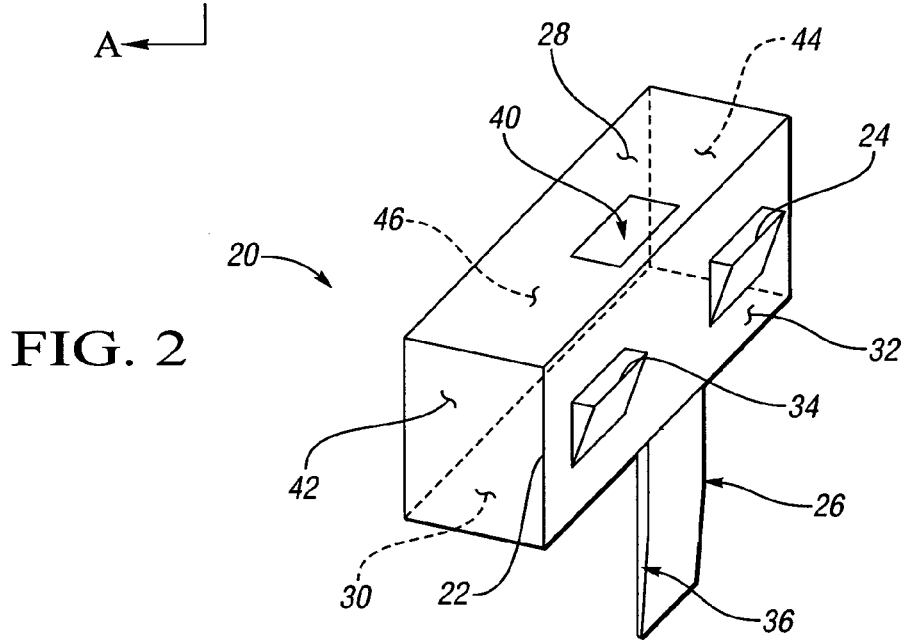
FIG. 2 is a schematic perspective view of one embodiment of the locking clip in FIG. 1.

The locking device comprises a locking clip 20 which is insertable between the gear 12 and housing 14. FIG. 1 is a schematic perspective view of a housing assembly illustrating a snap ring 16 and locking clip 20. FIG. 2 is a schematic perspective view of the locking clip 20, which is the first embodiment of the invention.

The locking clip 20 comprises a clip body 22, having a first locking tab 24 connected to the clip body 22, and a locating tab 26 connected to the clip body 22. The clip body 22 has a first surface 32, second surface 30 and a third surface 28. The first locking tab 24 and the locating tab 26 are attached onto or formed integrally on the first surface 32. The locating tab 26 is bendable. A second locking tab 34 is added onto the first surface 32, wherein the first and second locking tabs 24 and 34 are on opposite sides of the locating tab 26. The locating tab 26 has a tapered end 36 to allow for easy insertion during assembly. The second surface 30 of the clip body 22 is shaped or formed to permit clip assembly clearance 38. A removal pocket 40 is added to the third surface 28 to aid in removal of the locking clip 20. Fourth, fifth and sixth surfaces, 42, 44, and 46, respectively, may also be added.

In lightly loaded applications the locking clip 20 can eliminate the need for the snap ring 16 completely. The item previously retained by the snap ring 16 within a housing assembly may be retained by the locking clip 20 alone. The locking clip 20 described herein is suitable for use in other types of applications as a retention clip.

Without the locking clip 20, the snap ring 16 may move or rotate freely inside of the housing 14 and snap ring groove 18. This movement causes wear to the snap ring 16 and snap ring groove 18. The snap ring 16 has a circular shape with a gap 48 that is used or deformed to allow assembly of the snap ring 16 into the snap ring groove 18. The gap 48 in the snap ring 16 causes one side of the snap ring to be out of balance with the side of the snap ring opposite the gap. The position of the imbalance will change as the snap ring 16 rotates in the snap ring groove 18.

The locking clip 20 eliminates the rotation of the snap ring 16 and compensates for the material removed to form the gap 48 in the snap ring 16. The clip body 22 is used to block the movement of the snap ring 16 and fill the gap 48 with material of equal mass to balance the assembly. Without a locking clip 20, the snap ring 16 may also come out of the snap ring groove 18 in the housing 14. The locking clip 20 fills the gap 48 in the snap ring 16 and prevents the snap ring 16 from coming out of the snap ring groove 18 in the housing 14.

The locating tab 26 prevents the clip body 22 from moving in the snap ring groove 18 when the snap ring 16 pushes on the clip body 22. The first and second locking tabs 24 and 34 are used to retain the locking clip 20 in the housing 14 at their two respective locations. The first and second locking tabs 24 and 34 are placed on either side of the locating tab 26 and prevent the locking clip 20 from being pushed out of the housing 14. When the snap ring 16 pushes on the clip body 22 on the side of the first locking tab 24, the first locking tab 24 provides additional support to the locating tab 26 and stops the motion of the snap ring 16. When the snap ring 16 pushes on the clip body 22 on the side of the second locking tab 34, the second locking tab 34 provides additional support to the locating tab 26 and stops the motion of the snap ring 16. The locating tab 26 also acts as a spring to maintain the engagement of the first and second locking tabs 24 and 34 in the snap ring groove 18 of the housing 14 after assembly.

Figure 4A:
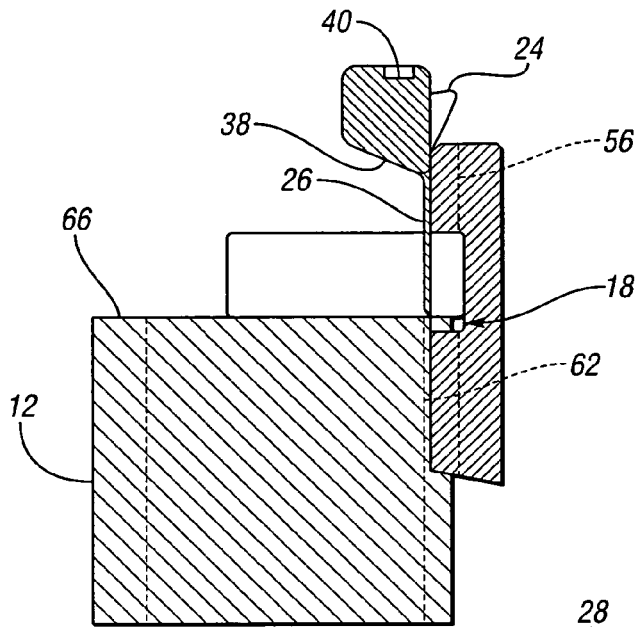
FIG. 4a is a schematic cross-sectional view of the housing assembly through line A-A in FIG. 1, illustrating the locking clip at the start of clip insertion in the assembly of FIG. 1.
Figure 4B:
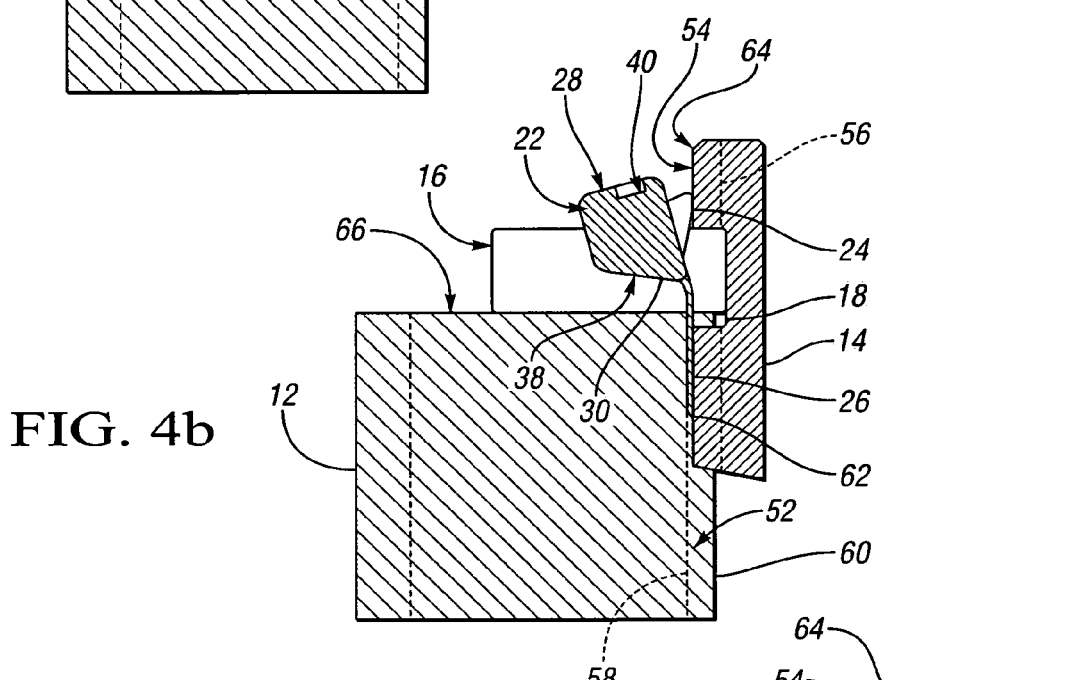
FIG. 4b is a schematic cross-sectional view of the housing assembly through line A-A in FIG. 1, illustrating a partially inserted locking clip.
Figure 4C:
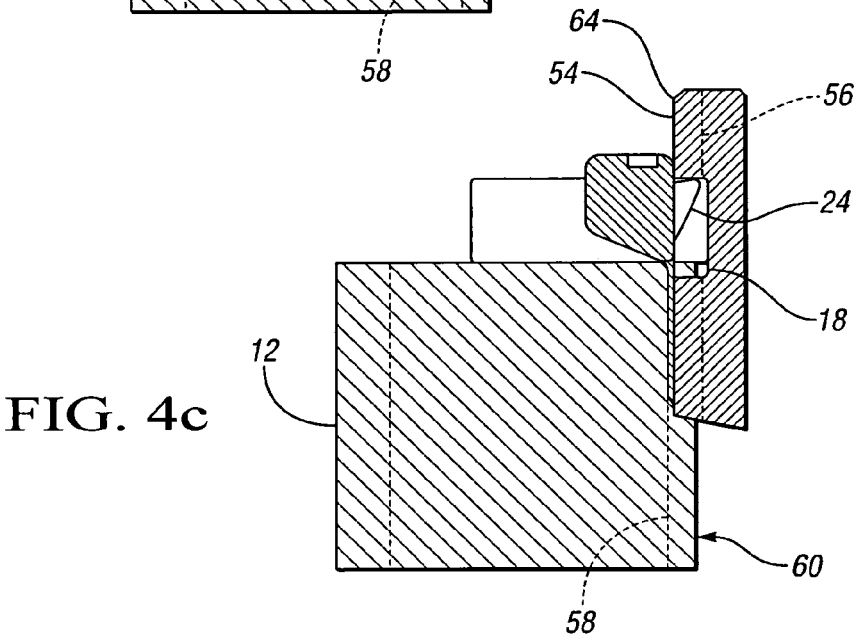
FIG. 4c is a schematic cross-sectional view of the housing assembly through line A-A in FIG. 1, illustrating a fully inserted locking clip in the assembly of FIG. 1.

Assembly Procedure:

FIG. 4a is a schematic cross-sectional view of the housing assembly 10 through line A-A in FIG. 1, illustrating the locking clip 20 at the beginning of assembly. FIG. 4b is a schematic cross-sectional view of the housing assembly 10 through line A-A in FIG. 1, illustrating a partially inserted locking clip 20. FIG. 4c is a schematic cross-sectional view of the housing assembly 10 through line A-A in FIG. 1, illustrating the locking clip 20 at the end of assembly.

The housing 14 has a housing spline 50 to locate the gear 12, with a complementary gear spline 52 inside of the housing 14. The housing spline 50 comprises a housing spline minor diameter 54 and a housing spline major diameter 56. The gear spline 52 comprises a gear spline minor diameter 58 and a gear spline major diameter 60. The housing spline 50 and gear spline 52 are designed so as to provide a tab clearance 62 between the housing spline minor diameter 54 and gear spline minor diameter 58. The locating tab 26 fits between the gear 12 and the housing 14 in the tab clearance 62 formed by the housing spline minor diameter 54 and gear spline minor diameter 58. Thus the tab clearance 62 is used to locate the locking clip 20 inside of the housing 14.

FIG. 4a shows the locking clip 20 at the beginning of assembly. The tapered end 36 of the locating tab 26 allows for easy insertion of the locating tab 26. As shown in FIG. 4a, the locating tab 26 is partially inserted into the tab clearance 62 between the housing 14 and gear 12 before the first and second locking tabs 24 and 34 make contact with the chamfer 64 of the housing 14. The clip body 22 begins to deflect away from the housing 14 and the locating tab 26 bends to allow the insertion of the locking clip 20 to continue, as shown in FIG. 4b. The bending of the locating tab 26 acts as a spring. As the insertion of the locking clip 20 continues and the clip body 22 moves closer to the gear face 66, the clip body 22 is required to have a clip assembly clearance 38. The bottom surface 30 of the clip body 22 is shaped to permit the clip assembly clearance 38. When the first and second locking tabs 24 and 34 reach the snap ring groove 18, the spring of the locating tab 26 pushes or causes the first and second locking tabs 24 and 34 to snap into place in the snap ring groove 18 and the locking clip 20 is then fully assembled, as shown in FIG. 4c.

Locking Clip Removal:

The housing assembly 10 can be serviced by removing the locking clip 20. A removal pocket 40 is provided for the removal of the locking clip 20. A force is applied to the removal pocket 40 to overcome the spring force of the locating tab 26. When the first and second locking tabs 24 and 34 come out of the snap ring groove 18, the locking clip 20 may be removed from the assembly 10.

Second Embodiment

Figure 3:
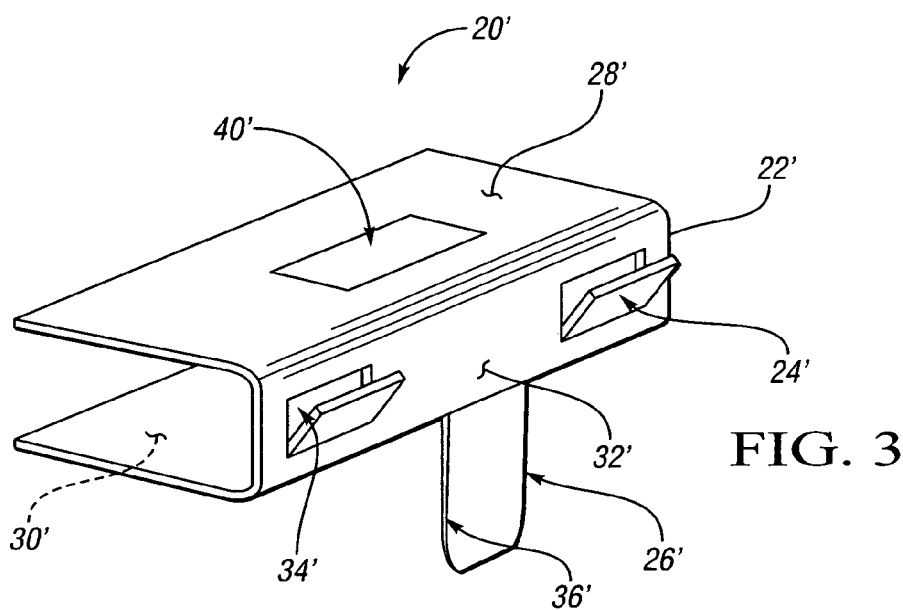
FIG. 3 is a schematic perspective view of another embodiment of the locking clip in FIG. 1.

FIG. 3 is a schematic perspective view of a locking clip 20', a second embodiment of the invention. The locking clip 20' includes a clip body 22', having a first locking tab 24' connected to the clip body 22', and a locating tab 26' connected to the clip body 22'. The clip body 22' has a first surface 32', second surface 30' and a third surface 28'. A first locking tab 24' and a locating tab 26' are attached onto or formed integrally on the first surface 32'. The locating tab 26' is bendable. A second locking tab 34' is added onto the first surface 32', wherein the first and second locking tabs 24' and 34' are on opposite sides of the locating tab 26'. The first and second locking tabs 24' and 34' for the locking clip 20' may be stamped on the first surface 32'. The locating tab 26' has a tapered end 36' to allow for easy insertion during assembly. The second surface 30' of the clip body 22' is shaped or formed to permit clip assembly clearance 38. A removal pocket 40' is added to the third surface 28' to aid in removal of the locking clip 20'.

As in the first embodiment, the locking clip 20' in the second embodiment eliminates the rotation of the snap ring 16 and compensates for the material removed to form the gap 48 in the snap ring 16. The clip body 22' is used to block the movement of the snap ring 16 and fill the gap 48 with material of equal mass to balance the assembly. When the locking clip 20' is inserted into the gap 48 then the ends of the snap ring 16 will hit the ends of the third surface 28' and second surface 30' of the locking clip 20'.

Materials:

The locking clips 20 and 20' as described in the first and second embodiments may be made from most materials. The most common materials for the locking clip 20 would be a molded plastic material or a polymer. The locking clip 20' may be made with sheet steel stamping. A steel-stamped locking clip 20' would not have fourth, fifth and sixth surfaces as in the first embodiment. Die castings or machine from solid materials may also be used.

A method of limiting movement and thereby balancing a gapped snap ring in a snap ring groove between rotatable parts is provided, comprising locating a mass in the snap ring gap in the snap ring groove wherein the mass is substantially equal to the mass of the material missing from the snap ring to form the gap, whereby to balance the rotation of the parts and the snap ring. The method further comprises positioning a tab portion of the mass in a clearance between the rotatable parts where the rotatable parts are interlocking, e.g., splined, whereby to assist in locating the mass. The method further comprises locking the mass in the snap ring groove after positioning the tab portion in the clearance.

A locking clip is provided for locating a gapped snap ring in a snap ring groove between complementary parts including a locking clip body having a body portion, a locking tab portion, and a locating tab portion; wherein the locking tab portion is insertable into the snap ring groove to limit movement of the snap ring in one direction, which is along the circumference of the snap ring. The locating tab is insertable between the complementary parts to limit movement of the snap ring in another direction, which is along the circumference of the snap ring and opposite to the direction previously mentioned. The mass of the locking clip body is substantially equal to the mass of the material missing from the snap ring to form the gap in the gapped snap ring.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
   a circular shaped snap ring having a gap such that said circular shaped snap ring is noncontinuous;
   a housing having a groove, said groove having a continuous shape substantially complementary to said snap ring;
   wherein said housing has a housing spline;
   said snap ring being fitted into said groove within said housing;
   a retained part within said housing;
   wherein said retained part has a retained part spline;
   a locking clip insertable between said retained part and said housing, wherein said locking clip includes:
   a clip body having a first surface;
   a first locking tab formed on said first surface of said clip body;
   a locating tab extending from said clip body;
   wherein said locating tab bends with respect to said clip body when said locking clip is inserted between said retained part and said housing;
   said clip body having a second surface, said second surface being shaped to permit said locating tab to bend with respect to said clip body when said locking clip is inserted between said retained part and said housing;
   wherein said locating tab is positioned between said retained part and said housing in a tab clearance defined between said housing spline and said retained part spline when said locking clip is positioned in said gap;
   wherein said locking clip is positioned in said gap in said snap ring to block rotation of said snap ring with respect to said housing when said locking clip is positioned in said gap.

2. The apparatus of claim 1, further comprising:
   a second locking tab on said first surface of said clip body; and
   wherein said first locking tab and said second locking tab protrude radially into said groove to retain said locking clip in said housing.

3. The apparatus of claim 1:
   wherein said first locking tab is stamped on said first surface.

4. The apparatus of claim 1,
   wherein said clip body has a third surface; and
   wherein said third surface has a removal pocket to aid in removal of said locking clip.

5. The apparatus of claim 1, wherein said clip body has fourth, fifth and sixth surfaces.

6. The apparatus of claim 1:
   wherein the locating tab is positioned in said tab clearance and said tab clearance is formed by direct engagement of said housing spline and said retained part spline.

7. The apparatus of claim 6, wherein:
   said housing spline includes a housing spline minor diameter and a housing spline major diameter;
   said retained part spline includes a retained part spline minor diameter and a retained part spline major diameter; and
   wherein said tab clearance is formed between said housing spline minor diameter and said retained part spline minor diameter.

8. The apparatus of claim 1, wherein said locating tab has a tapered end to allow for easy insertion between said retained part and said housing.

9. The apparatus of claim 1, wherein said locating tab sufficiently bends to act as a spring causing said first locking tab to snap into place in said groove within said housing.

10. The apparatus of claim 1:
    wherein said locking tab portion protrudes radially into said groove in said housing to retain the locking clip in said housing; and
    wherein said locking clip is characterized by a mass such that said circular shaped snap ring with said locking clip so positioned in said gap in said snap ring is substantially rotationally balanced.

* * * * *